United States Patent
Kellam et al.

(10) Patent No.: US 8,126,799 B2
(45) Date of Patent: Feb. 28, 2012

(54) METHOD OF BIDDING TO DRIVE COMPETITION IN AN AUCTION

(75) Inventors: Jennifer Kellam, Pittsburgh, PA (US);
Leigh A. Tangretti, Greensburg, PA (US); Valerie Colaico, Pittsburgh, PA (US); Phil Beck, Bridgeville, PA (US)

(73) Assignee: Ariba, Inc., Sunnyvale, CA (US)

( * ) Notice: Subject to any disclaimer, the term of this patent is extended or adjusted under 35 U.S.C. 154(b) by 1492 days.

(21) Appl. No.: 10/043,357

(22) Filed: Jan. 9, 2002

(65) Prior Publication Data

US 2003/0130927 A1    Jul. 10, 2003

(51) Int. Cl.
*G06Q 40/00* (2006.01)
*G06Q 30/00* (2006.01)

(52) U.S. Cl. ........ 705/37; 705/26.2; 705/26.3; 705/26.4

(58) Field of Classification Search ............... 705/37, 705/26.2, 26.3, 26.4
See application file for complete search history.

(56) References Cited

U.S. PATENT DOCUMENTS

| | | | |
|---|---|---|---|
| 3,581,072 A | 5/1971 | Nymeyer | |
| 3,863,060 A | 1/1975 | Rode et al. | |
| 4,597,045 A | 6/1986 | Kiuchi | |
| 4,674,044 A | 6/1987 | Kalmus et al. | |
| 4,789,928 A | 12/1988 | Fujisaki | |
| 4,799,156 A | 1/1989 | Shavit et al. | |
| 4,845,625 A | 7/1989 | Stannard | |
| 4,992,940 A | 2/1991 | Dworkin | |
| 5,136,501 A | 8/1992 | Silverman et al. | |
| 5,193,056 A | 3/1993 | Boes | |
| 5,243,515 A | 9/1993 | Lee | |
| 5,297,032 A | 3/1994 | Trojan et al. | |
| 5,375,055 A | 12/1994 | Togher et al. | |
| 5,394,324 A | 2/1995 | Clearwater | |
| 5,402,336 A | 3/1995 | Spiegelhoff et al. | |
| 5,606,602 A | 2/1997 | Johnson et al. | |
| 5,629,982 A | 5/1997 | Micali | |
| 5,640,569 A | 6/1997 | Miller et al. | |
| 5,664,115 A | 9/1997 | Fraser | |
| 5,684,963 A | 11/1997 | Clement | |
| 5,689,652 A | 11/1997 | Lupien et al. | |
| 5,715,402 A | 2/1998 | Popolo | |
| 5,727,165 A | 3/1998 | Ordish et al. | |

(Continued)

FOREIGN PATENT DOCUMENTS

EP    0399850 A  * 11/1990

(Continued)

OTHER PUBLICATIONS

Andrews, "Auctions Catch the Interest of Hobbyists and Big Business", Aug. 24, 1998.*

(Continued)

*Primary Examiner* — Gregory Johnson
(74) *Attorney, Agent, or Firm* — Van Pelt, Yi & James LLP

(57) ABSTRACT

A method of bidding to drive competition in an auction, including receiving a plurality of bids from a plurality of bidders, distinguishing the bidders according to a subset of a parameter, assigning at least one identifier to the bidders in each subset, the subset associated with the identifier is unknown to the bidders outside of the subset, and displaying a lowest bid with the identifier for each bidder.

29 Claims, 4 Drawing Sheets

U.S. PATENT DOCUMENTS

| | | | |
|---|---|---|---|
| 5,758,327 | A | 5/1998 | Gardner et al. |
| 5,758,328 | A | 5/1998 | Giovannoli |
| 5,765,138 | A | 6/1998 | Aycock et al. |
| 5,774,873 | A | 6/1998 | Berent et al. |
| 5,794,207 | A | 8/1998 | Walker et al. |
| 5,794,219 | A | 8/1998 | Brown |
| 5,797,127 | A | 8/1998 | Walker et al. |
| 5,799,151 | A | 8/1998 | Hoffer |
| 5,799,285 | A | 8/1998 | Klingman |
| 5,802,502 | A | 9/1998 | Gell et al. |
| 5,803,500 | A | 9/1998 | Mossberg |
| 5,809,483 | A | 9/1998 | Broka et al. |
| 5,826,244 | A | 10/1998 | Huberman |
| 5,832,496 | A | 11/1998 | Anand et al. |
| 5,835,896 | A | 11/1998 | Fisher et al. |
| 5,862,223 | A | 1/1999 | Walker et al. |
| 5,890,138 | A * | 3/1999 | Godin et al. |
| 5,897,621 | A * | 4/1999 | Boesch et al. |
| 5,905,974 | A * | 5/1999 | Fraser et al. |
| 5,905,975 | A * | 5/1999 | Ausubel |
| 5,915,209 | A * | 6/1999 | Lawrence |
| 5,966,699 | A * | 10/1999 | Zandi |
| 6,014,627 | A * | 1/2000 | Togher et al. |
| 6,021,398 | A * | 2/2000 | Ausubel |
| 6,023,685 | A * | 2/2000 | Brett et al. |
| 6,044,363 | A * | 3/2000 | Mori et al. |
| 6,055,518 | A * | 4/2000 | Franklin et al. |
| 6,058,379 | A * | 5/2000 | Odom et al. |
| 6,061,663 | A * | 5/2000 | Bloom et al. |
| 6,078,906 | A * | 6/2000 | Huberman |
| 6,119,229 | A * | 9/2000 | Martinez et al. |
| 6,141,653 | A * | 10/2000 | Conklin et al. ............... 705/80 |
| 6,151,589 | A * | 11/2000 | Aggarwal et al. |
| 6,161,099 | A * | 12/2000 | Harrington et al. |
| 6,167,386 | A * | 12/2000 | Brown ............... 705/37 |
| 6,199,050 | B1 | 3/2001 | Alaia et al. |
| 6,243,691 | B1 * | 6/2001 | Fisher et al. ............... 705/37 |
| 6,266,652 | B1 | 7/2001 | Godin et al. |
| 6,366,891 | B1 | 4/2002 | Feinberg |
| 6,565,442 | B2 * | 5/2003 | La Mura et al. ............... 463/42 |
| 7,181,419 | B1 * | 2/2007 | Mesaros ............... 705/26.2 |
| 7,272,579 | B1 * | 9/2007 | Canali et al. ............... 705/37 |
| 7,383,206 | B2 * | 6/2008 | Rupp et al. ............... 705/26 |
| 7,430,523 | B1 * | 9/2008 | Khalidi ............... 705/26.4 |
| 7,461,022 | B1 * | 12/2008 | Churchill et al. ............... 705/37 |
| 7,558,752 | B1 * | 7/2009 | Ephrati et al. ............... 705/37 |
| 7,636,683 | B1 * | 12/2009 | Mills et al. ............... 705/37 |
| 7,720,743 | B1 * | 5/2010 | Marks ............... 705/37 |
| 2001/0032170 | A1 * | 10/2001 | Sheth ............... 705/37 |
| 2001/0032175 | A1 * | 10/2001 | Holden et al. ............... 705/37 |
| 2001/0034663 | A1 * | 10/2001 | Teveler et al. ............... 705/26 |
| 2001/0039528 | A1 * | 11/2001 | Atkinson et al. ............... 705/37 |
| 2001/0047284 | A1 * | 11/2001 | Blalock et al. ............... 705/8 |
| 2002/0002500 | A1 * | 1/2002 | Takahashi ............... 705/26 |
| 2002/0016759 | A1 * | 2/2002 | Macready et al. ............... 705/37 |
| 2002/0032632 | A1 * | 3/2002 | Sernet ............... 705/37 |
| 2002/0049642 | A1 * | 4/2002 | Moderegger et al. ............... 705/26 |
| 2002/0049664 | A1 * | 4/2002 | Hoffman et al. ............... 705/37 |
| 2002/0069134 | A1 * | 6/2002 | Solomon ............... 705/26 |
| 2002/0099611 | A1 * | 7/2002 | De Souza et al. ............... 705/26 |
| 2002/0099638 | A1 * | 7/2002 | Coffman et al. ............... 705/37 |
| 2002/0099643 | A1 * | 7/2002 | Abeshouse et al. ............... 705/37 |
| 2002/0116287 | A1 * | 8/2002 | Schubert et al. ............... 705/26 |
| 2002/0147674 | A1 * | 10/2002 | Gillman ............... 705/37 |
| 2002/0161697 | A1 * | 10/2002 | Stephens et al. ............... 705/37 |
| 2002/0174050 | A1 * | 11/2002 | Eynard et al. ............... 705/37 |
| 2003/0004850 | A1 * | 1/2003 | Li et al. ............... 705/37 |
| 2003/0009421 | A1 * | 1/2003 | Bansal et al. ............... 705/39 |
| 2003/0014326 | A1 * | 1/2003 | Ben-Meir et al. ............... 705/26 |
| 2003/0018515 | A1 * | 1/2003 | Guler et al. ............... 705/10 |
| 2003/0018562 | A1 * | 1/2003 | Guler et al. ............... 705/37 |
| 2003/0023514 | A1 * | 1/2003 | Adler et al. ............... 705/27 |
| 2003/0033239 | A1 * | 2/2003 | Gilbert et al. ............... 705/37 |
| 2003/0041008 | A1 * | 2/2003 | Grey et al. ............... 705/37 |
| 2003/0041010 | A1 * | 2/2003 | Yonao-Cowan ............... 705/37 |
| 2003/0055773 | A1 * | 3/2003 | Guler et al. ............... 705/37 |
| 2003/0088501 | A1 * | 5/2003 | Gilbert et al. ............... 705/37 |
| 2003/0093343 | A1 * | 5/2003 | Huttenlocher et al. ............... 705/35 |
| 2003/0093355 | A1 * | 5/2003 | Issa ............... 705/37 |
| 2004/0068459 | A1 * | 4/2004 | Goulet et al. ............... 705/37 |
| 2004/0215467 | A1 * | 10/2004 | Coffman et al. ............... 705/1 |
| 2006/0218076 | A1 * | 9/2006 | Walker et al. ............... 705/37 |

FOREIGN PATENT DOCUMENTS

| | | | |
|---|---|---|---|
| JP | 409101994 A | * | 4/1997 |
| JP | 410078992 A | * | 3/1998 |
| WO | WO 92/15174 | * | 9/1992 |
| WO | WO 97/37315 | * | 10/1997 |
| WO | WO 98/34187 | * | 8/1998 |
| WO | WO 99/63461 | * | 12/1999 |

OTHER PUBLICATIONS

Associated Press, "Auction on Web is Buyer's Market", Apr. 6, 1998.*

"BroadVision Developing First Interactive Commerce Management System to Support Online Sales & Marketing Process; New Software Category Necessary to Interactive Network Architecture", Business Wire, p5150152, May 15, 1995.*

Danny Cohen, "Computerized Commerce", Information Processing 89, Aug. 28-Sep. 1, 1989.

"FairMarket Launches New Self-Serve Auctions", Business Wire, p. 6161495, Jun. 16, 1998.

Jahnke, "How Bazaar", CIO Web Business Magazine, Aug. 27, 1998.

Jean-Pierre Banatre, et al., "The Design and Building of Enchere, a Distributed Electronic Marketing System" Communications of the ACM, No. 1, Jan. 29, 1986.

Lee, "Do electronic marketplaces lower the price of goods?", Communications of the PCM, v41n1 pp. 73-80, Jan. 1998.

Malone, et al., "The Logic of Electronic Markets", Harvard Business Review, No. 893II, May-Jun. 1989.

"Moai Technologies Introduces New categories of Business to Business Auction Software . . . ", Business Editors and Computer Writers, Mar. 16, 1998.

Kikuchi, et al., "Multi-Round Anonymous Auction Protocols", IEICE Trans. Inf. & Syst., vol. E82-D, No. 4, Apr. 1999.

"Online bidding software", Electronic Buyers' News, Issue 1072, p. 86, 1/6p, Aug. 25, 1997.

Sairamesh, et al., "Economic Framework for Pricing and Charging Digital Libraries", D-Lip Magazine, Feb. 1996.

"Sold! . . . To the Lowest Bidder", Computer Finance, v6, n2, Jul. 1995.

"Venture Capitalists Fund Two Massachusetts Internet Related Companies", Boston Globe, Jan. 14, 1998.

Vigoroso, "Buyers prepare for brave new world of e-commerce", Purchasing, v126, n6, p. S4(1), Apr. 22, 1999.

Von der Fehr, et al., "Predatory bidding in sequential auctions", Oxford Economics Papers, v46, n3, p. 345(12), Jul. 1994.

"What you need to know to bid in FCC's narrowband auction", Washington Telecom News, v2, n26, p. 6(2), Jun. 27, 1994.

Wilder, "What's Your Bid?—FreeMarkets' real-time online bidding technology lets clients drive downcosts and improve product value", InformationWeek, Nov. 10, 1997.

Woolley, "E-muscle", Forbes, Mar. 9, 1998.

* cited by examiner

US 8,126,799 B2

METHOD OF BIDDING TO DRIVE COMPETITION IN AN AUCTION

FIELD OF THE INVENTION

The invention relates generally to conducting online electronic auctions, and in particular, to competitive bidding in a parameter.

BACKGROUND OF THE INVENTION

Procurement Models

It is believed that procurement of goods and services has traditionally involved high transaction costs. The cost of finding and qualifying potential bidders has been particularly high. The advent of electronic commerce has introduced new methods of procurement that lower some of the transaction costs associated with procurement. Electronic procurement, and in particular business-to-business electronic procurement, matches buyers and suppliers and facilitates transactions that take place on networked processors.

Supplier-bidding auctions for products and services defined by a buyer have been developed. In a supplier-bidding auction, bid prices may start high and move downward in reverse-auction format as suppliers interact to establish a closing price. The auction marketplace is often one-sided, i.e., one buyer and many potential suppliers. It is believed that, typically, the products being purchased are components or materials. "Components" may mean fabricated tangible pieces or parts that become part of assemblies of durable products. Example components include gears, bearings, appliance shelves, or door handles. "Materials" may mean bulk quantities of raw materials that are further transformed into product. Example materials include corn syrup or sheet steel.

Industrial buyers may not purchase one component at a time. Rather, they may purchase whole families of similar components. These items may therefore be grouped into a single lot. Suppliers in industrial auctions may provide unit price quotes for all line items in a lot.

Auction Process

In many types of business transactions, price may not be the sole parameter upon which a decision is made. For example, in the negotiations for a supply contract, a buyer may compare various proposals not only on the basis of price but also on the basis of the non-price characteristics of nonstandard goods, the location of the supplier, the reputation of the supplier, etc. In a typical business-to-business situation, a plurality of parameters may be considered in combination with the supplier's price proposal.

In these situations, purchasers may negotiate with each supplier independently because multi-parameter bids may not be readily compared. Actual comparisons by the purchaser may be based on a combination of subjective and objective weighting functions. Bidders may not have access to information on the buyer-defined weighting functions. At most, bidders may be selectively informed (at their disadvantage) of aspects of other competing bids. The limited communication of information between bidders may limit the potential of true competition between the bidders. The absence of competition may lower the likelihood that the bidders approach their true walk-away bid. Further, the manual weighting process may be time consuming and subject to inconsistency from one application to the next.

SUMMARY OF THE INVENTION

The invention provides a method of bidding to drive competition in an auction. This method includes receiving a plurality of bids from a plurality of bidders, distinguishing the bidders according to a subset of a parameter, assigning at least one identifier to the bidders in each subset, and displaying a lowest bid with the identifier for each bidder. The subset associated with the identifier is unknown to the bidders outside of the subset.

The invention provides another method of bidding to drive competition in an auction. This method includes soliciting a plurality of bids, receiving the bids from a plurality of bidders, distinguishing the bidders according to a subset of a parameter, assigning at least one identifier to the bidders in each subset, setting, in each subset, bid terms, displaying a lowest bid with the identifier for each bidder, allowing competition of the bidders within the subset and the parameter, and updating the display with new lowest bids from the bidders. The subset associated with the identifier is unknown to the bidders outside of the subset.

The invention also provides a system of bidding to drive competition in an auction. This system includes a database for receiving and storing bid information from bidders and software for distinguishing the bidders according to a subset of a parameter, assigning at least one identifier to the bidders in each subset, and displaying a lowest bid with the identifier for each bidder. The subset associated with the identifier is unknown to the bidders outside of the subset.

The invention further provides a machine readable medium for bidding to drive competition in an auction. This machine readable medium includes a first machine readable code that receives a plurality of bids from a plurality of bidders, a second machine readable code that distinguishes the bidders according to a subset of a parameter and assigns at least one identifier to the bidders in each subset, and a third machine readable code that displays a lowest bid with the identifier for each bidder. The subset associated with the identifier is unknown to the bidders outside of the subset.

BRIEF DESCRIPTION OF THE DRAWINGS

The accompanying drawings, which are incorporated herein and constitute a part of this specification, illustrate the presently preferred embodiments of the invention and, together with the general description given above and the detailed description given below, serve to explain the features of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical auction systems and computer networks.

The invention provides a method of bidding to drive competition in an auction. The invention is designed to create a market of competition in business transactions that traditionally could not take advantage of natural auction dynamics. The method is particularly applicable to online auctions where bidders submit bids for supply contracts to an auction coordinator electronically during the auction process.

The following description of the features of the present invention is presented in the context of downward-based online industrial auctions. However, as would be appreciated by one of ordinary skill in the relevant art, these inventive features could also be applied in the context of upward-based online auctions as well.

Figure 1A:
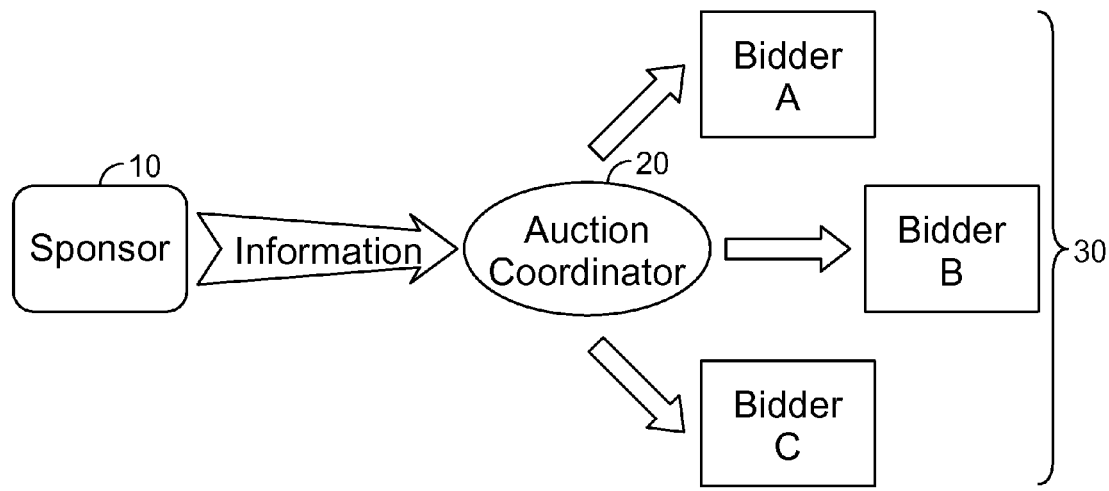
FIG. 1A is a flow diagram of a request for quotation in an auction.

The basic process for a purchaser sponsored supplier-bidding or reverse auction, as conducted by the assignee of the present invention, is described below with reference to FIG. 1. FIG. 1 illustrates the functional elements and entities involved in setting up and conducting a typical supplier-bidding auction. FIG. 1A illustrates the creation of an auctioning event, FIG. 1B illustrates the bidding during an auction, and FIG. 1C illustrates results after completion of a successful auction.

In the supplier-bidding reverse auction model, the product or service to be purchased is, preferably defined by the sponsor, or originator, 10 of the auction, as shown in FIG. 1A. Alternatively, the buyer may set up all or some of its own bidding events and find its own suppliers. In that case, the sponsor 10 would run the events through a market operations center, which is a facility where auctions are monitored and participants receive assistance. If the sponsor 10 decides to use the auctioning system of the present invention to procure products or services, the sponsor 10 may provide information to an auction coordinator 20. That information may include information about incumbent suppliers and historic prices paid for the products or services to be auctioned, for example. Preferably, the sponsor 10 also works with the auction coordinator 20 to define the products and services to be purchased in the auction and lot the products and services appropriately so that desired products and services can be procured using optimal auction dynamics. A specification may then be prepared for each desired product or service, and a Request for Quotation ("RFQ") may be generated for the auction.

Next, the auction coordinator 20 may identify potential suppliers, or bidders 30, preferably, with input from the sponsor 10, and invite the potential suppliers 30 to participate in the upcoming auction. The suppliers 30 that are selected to participate in the auction may become bidders 30 and may be given access to the RFQ, typically through an RFQ in a tangible form, such as on paper or in an electronic format.

Figure 1B:
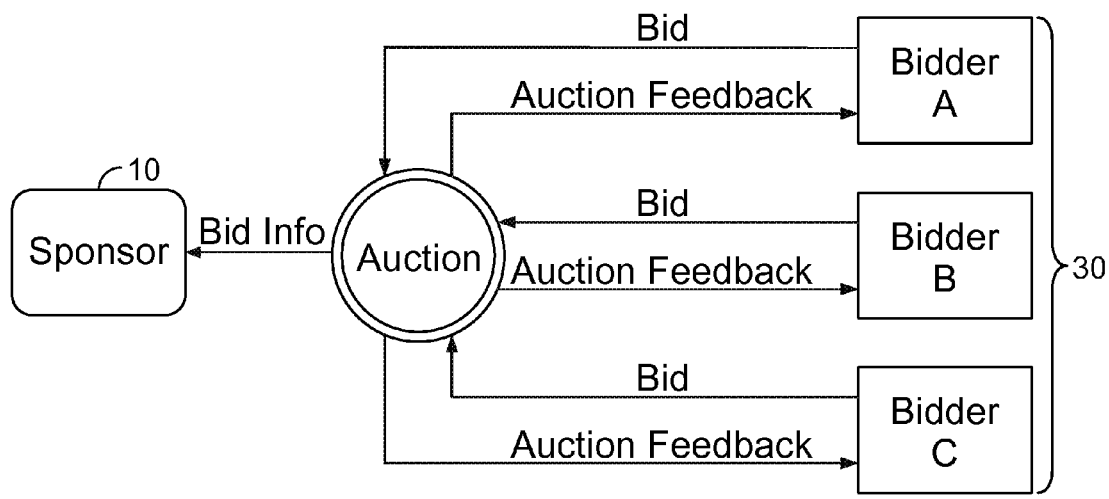
FIG. 1B is a flow diagram of a bidding process in an auction.
Figure 1C:
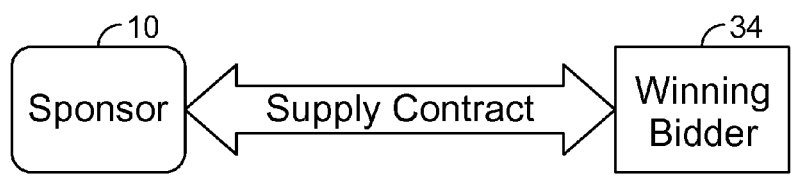
FIG. 1C is a flow diagram of a contract award following an auction.

As shown in FIG. 1B, during a typical auction, bids are made for lots. Bidders 30 may submit actual unit prices for all line items within a lot, however, the competition in an auction is typically based on the aggregate value bid for all line items within a lot. The aggregate value bid for a lot may, therefore, depend on the level and mix of line item bids and the quantity of goods or services that are offered for each line item. Thus, bidders 30 submitting bids at the line item level may actually be competing on the lot level. During the auction, the sponsor 10 may typically monitor the bidding as it occurs. Bidders 30 may also be given market feedback during the auction so that they may bid competitively.

After the auction, the auction coordinator 20 may analyze the auction results with the sponsor 10. The sponsor 10 may conduct final qualification of the low bidding supplier or suppliers 30. The sponsor 10 may furthermore retain the right not to award business to a low bidding supplier 30 based on final qualification or other business concerns. As shown in FIG. 1C, a supply contract may be drawn up for the winning bidder 34 and executed based on the results of the auction. Winning bidder 34 is one of bidders 30.

The auction may be conducted electronically between bidders 30 at their respective remote sites and the auction coordinator 20 at its site. Alternatively, instead of the auction coordinator 20 managing the auction at its site, the sponsor 10 may perform auction coordinator tasks at its site.

Figure 2:
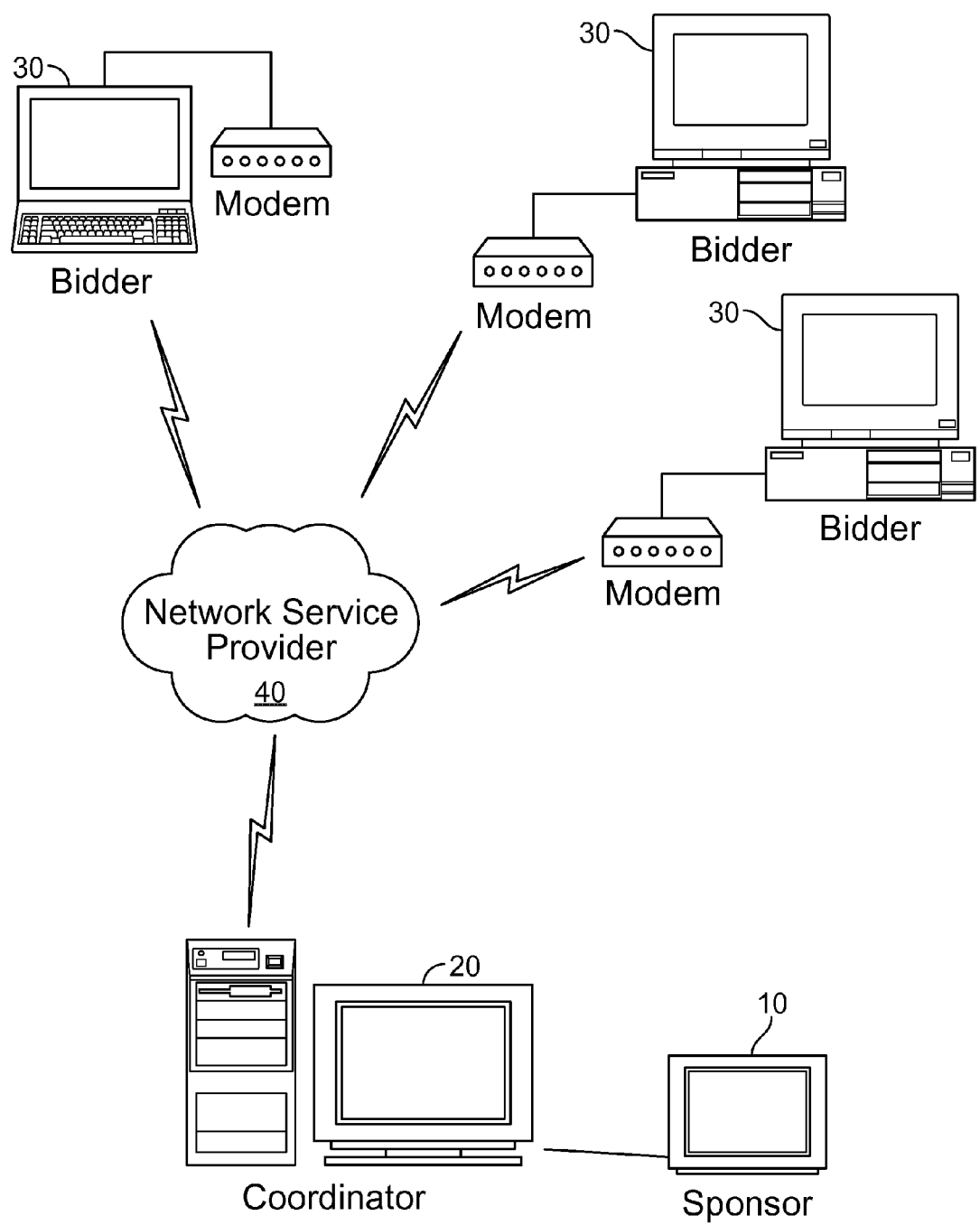
FIG. 2 is a schematic illustration of communications links between the coordinator, the buyer, and the suppliers in an auction.

Information may be conveyed between the coordinator 20 and the bidders 30 via any communications medium. As shown in FIG. 2, bidders 30 may be connected to the auction through the Internet via a network service provider 40 accessed, for example, through a dial-up telephone connection. Alternatively, sponsors 10 and bidders 30 may be coupled to the auction by communicating directly with the auction coordinator 20 through a public switched telephone network, a wireless network, or any other connection.

Figure 3:
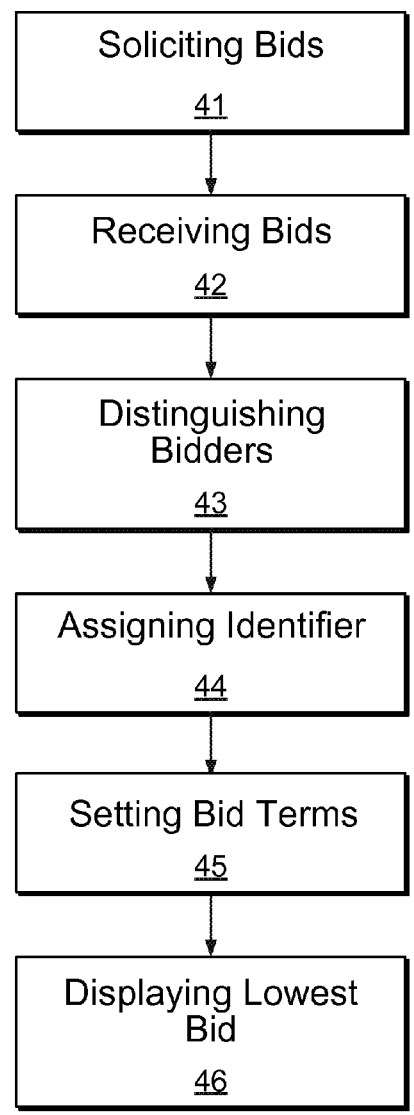
FIG. 3 is a block flow diagram of an embodiment of the method of the invention.

In the preferred embodiment, as shown in FIG. 3, bids may be solicited by the auction coordinator 20 in step 41. Bids are then received from bidders 30 in step 42. Each bidder 30 may bid on one or more lots, depending on what and how many lots are available. The received bids are distinguished according to a subset of a parameter in step 43. The parameter may, for example, be regions, payment terms, delivery terms, contract length, contract volume, material, qualification status, or any other variable that may be divided into subsets or sections. The subset may be geographical areas for the regions, methods of payment for the payment terms, methods of delivery for the delivery terms, times for the contract length, capacities for the contract volume, types of material for the material, and approval or certification for the qualification status.

In step 44, identifiers are assigned to the bidders 30 based on their subset. These identifiers may indicate a number of bidders in each subset. Each bidder 30 in a subset may have a different identifier, where the identifiers have a common characteristic or the same identifier. For example, if the parameter is region and the subsets are North America, Asia, Europe, and South America, the identifiers with a common characteristic may be 121, 122, 125, and 127 for bidders in North America, 135, 137, and 139 for bidders in Asia, 155, 156, and 157 for bidders in Europe, and 171 and 176 for bidders in South America. The common characteristics include ranges of numbers, including the 120s range, 130s range, 150s range, and 170s range. If the identifier is the same for each bidder 30 in a subset, then bidders 30 in North America may all have 120 as an identifier, bidders 30 in Asia may all have 130 as an identifier, bidders 30 in Europe may all have 150 as an identifier, and bidders 30 in South America may all have 170 as an identifier. Preferably, in either situation, only the bidders 30 in the same subset know their identifiers are associated with their region. The bidders 30 will know the regions, but will neither know which identifiers belong to the other subsets nor how many bidders are in the subsets.

In the preferred embodiment, bid terms, such as a reserve price, historic price, target price, time dependent variables, and bid strategies, are set for each subset in step 45. The bid terms may vary with each subset. The time dependent variables may be opening time, closing time, time extensions, or disclosures based on time, where complete market information is disclosed to all bidders in all subsets until there is a certain time remaining and only the top bidders have access to the complete market information. In one example using time dependent variables, the opening time and closing time for the North America subset may be different than the opening time and closing time for the Asia subset because of different time zones. In step 46, the lowest bid is displayed with the identifier for the bidder who placed that bid. The display may show only one lowest bid for the subset or the lowest bid for each bidder 30 in the subset so that bidders 30 may compare the bids. This allows competition of the bidders 30 within the subset and within the parameter. In one example, bidder 125 may be initially competing with bidders 121, 122, and 127 in the North America subset for supplying lots in the North American region, while bidders 171 and 176 compete against one another in the South America subset for supplying lots in the South American region and globally. Bids in the North America subset may initially be higher than bids in the South America subset, but after several hours of competition within the North American subset, these bids from bidders 121, 122, 125 and 127 may become competitive with bids from bidders 171 and 176. As a result, bidders 121, 122, 125, and 127 will begin to compete globally. Preferably, the lowest bids from each bidder are updated with new lowest bids from those same bidders.

Figure 4:
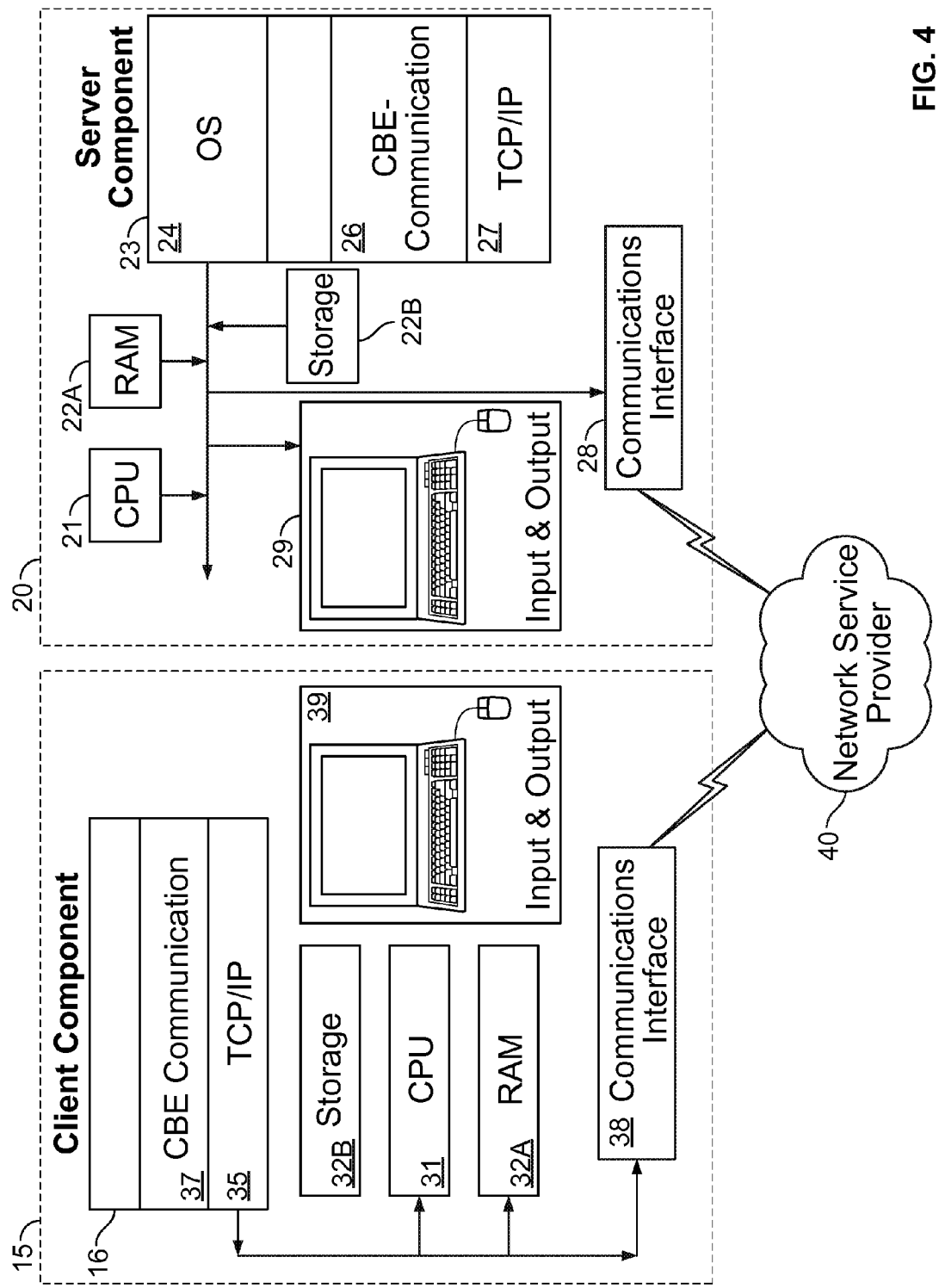
FIG. 4 is a schematic illustration of auction software and computers hosting that software in an auction.

A computer software application may be used to manage the auction. Preferably, as shown in FIG. 4, the software application has two components: a client component 16 and a server component 23. The client component 16 may operate on a computer at the site of each of the potential suppliers 30. Suppliers 30 make bids during the auction using the client component 16. The bids may be sent via the network service provider 40 to the site of the coordinator, where it is received by the server component 23 of the software application. The client component 16 may include software used to make a connection through telephone lines or the Internet to the server component 23. Bids may be submitted over this connection and updates may be sent to the connected suppliers.

Bids may only be submitted using the client component 16 of the application. This ensures that buyers do not circumvent the bidding process, and that only invited suppliers participate in the bidding. Bidders 30 may see their bids and bids placed by other suppliers for each lot on the client component 16. When a bidder 30 submits a bid, that bid is sent to the server component 23 and evaluated to determine whether the bid is from an authorized bidder and whether the bid has exceeded a predetermined maximum acceptable price. Bids placed by a supplier may be broadcast to all connected bidders, thereby enabling every participating bidder to quickly view the change in market conditions and begin planning their competitive responses.

The embodiments of the invention may be implemented by a processor-based computer system. The system includes a database for receiving and storing bid information from bidders and software for distinguishing the bidders 30 according to a subset of a parameter, assigning at least one identifier to the bidders 30 in each subset, and displaying a lowest bid with the identifier for each bidder. The subset associated with the identifier is unknown to the bidders 30 outside of the subset.

With reference to FIG. 4, a computer system 20 operates to execute the functionality for server component 23. Computer system 20 includes a processor 21, a memory 22A and a disk storage 22B. Memory 22A stores computer program instructions and data. Processor 21 executes the program instructions or software, and processes the data, stored in memory 22A. Disk storage 22B stores data to be transferred to and from memory 22A. All these elements are interconnected by one or more buses, which allows data to be intercommunicated between the elements.

Processor 21 may be any type of processor capable of providing the speed and functionality required by the embodiments of the invention. For example, processor 21 could be a processor from a family of processors made by Intel Corporation or Motorola.

For purposes of this application, memory 22A and disk 22B are machine readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), optical fiber, electrical signals, lightwave signals, radio-frequency (RF) signals and any other device or signal that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, system 20 may contain various combinations of machine readable storage devices, which are accessible by processor 21 and which are capable of storing a combination of computer program instructions and data.

Memory 22A is accessible by processor 21 over a bus and includes an operating system, a program partition and a data partition. The program partition stores and allows execution by processor 21 of program instructions that implement the functions of each respective system described herein. The data partition is accessible by processor 21 and stores data used during the execution of program instructions. For some embodiments of the invention, the program partition contains program instructions that performs the buy versus leasing transformation functionality described above.

Computer system 20 also includes a network interface 28. Network interface 28 may be any suitable means for controlling communication signals between network devices using a desired set of communications protocols, services and operating procedures. Communication protocols are layered, which is also referred to as a protocol stack, as represented by operating system 24, a CBE-communication layer 26, and a Transport Control Protocol/Internet Protocol (TCP/IP) layer 27. Network interface 28 also includes connectors for connecting interface 28 with a suitable communications medium. Those skilled in the art will understand that network interface 28 may receive communication signals over any suitable medium such as twisted-pair wire, co-axial cable, fiber optics, radio-frequencies, and so forth.

FIG. 4 also shows a computer system 15 that operates to execute the functionality for client component 16. Computer system 15 includes a processor 31, a memory 32A, disk storage 32B, a communications interface 38, and a protocol stack having a CBE-communication layer 37 and a TCP/IP layer 35. These elements operate in a manner similar to the corresponding elements for computer system 20.

Another embodiment of the invention includes a first machine readable code that receives a plurality of bids from bidders 30, a second machine readable code that distinguishes the bidders 30 according to a subset of a parameter and assigns at least one identifier to the bidders 30 in each subset, and a third machine readable code that displays a lowest bid with the identifier for each bidder. The subset associated with the identifier is unknown to the bidders 30 outside of the subset.

While the invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents.

What is claimed is:

1. A method, comprising:
receiving a plurality of bids from a plurality of bidders wherein the plurality of bidders are participants in a same auction;
using a processor to distinguish the bidders into at least a first subset and a second subset based on a parameter;
assigning at least one identifier to the bidders in the first subset, wherein the at least one identifier is known to the bidders in the first subset and is neither assigned to nor known to the bidders in the second subset; and
displaying, to each bidder in the first subset of bidders, a lowest bid and an identifier assigned to the bidder that submitted the lowest bid.

2. The method of claim 1 further comprising receiving a new lowest bid and displaying to each bidder in the first subset of bidders the new lowest bid and an identifier assigned to the bidder that submitted the new lowest bid.

3. The method of claim 1 further comprising setting a first set of bid terms for the first subset and setting a second set of bid terms for the second subset, wherein the first set of bid terms and second set of bid terms are not identical.

4. The method of claim 3 wherein the setting comprises: establishing at least one of a reserve price, a historic price, a target price, time dependent variables, and bid strategies.

5. The method of claim 4 wherein the establishing comprises: providing time dependent variables including at least one of an opening time, a closing time, time extensions, and disclosures based on time.

6. The method of claim 1 wherein the parameter comprises at least one of regions, payment terms, delivery terms, contract length, contract volume, material, and qualification status.

7. The method of claim 6 wherein the parameter comprises regions and wherein assigning at least one identifier comprises: allotting a range of numbers to each region; and giving a number to each bidder in the region.

8. The method of claim 7 wherein the displaying comprises: illustrating the lowest bids to allow a comparison regionally and globally.

9. The method of claim 1 wherein the receiving comprises: accepting bids for a plurality of lots.

10. The method of claim 1 wherein assigning includes assigning a plurality of identifiers to the bidders in the first subset.

11. The method of claim 10 wherein each of the identifiers included in the plurality of identifiers have a common characteristic.

12. A system, comprising:
an interface configured to receive a plurality of bids from a plurality of bidders wherein the plurality of bidders are participants in a same auction; and
a processor configured to:
use a parameter to distinguish the bidders into at least a first subset and a second subset;
assign at least one identifier to the bidders in the first subset, wherein the at least one identifier is known to the bidders in the first subset and is neither assigned to nor known to the bidders in the second subset; and
cause a display of, for each bidder in the first subset of bidders, a lowest bid and an identifier assigned to the bidder that submitted the lowest bid.

13. The system of claim 12 wherein the parameter comprises at least one of regions, payment terms, delivery terms, contract length, contract volume, material, and qualification status.

14. The system of claim 13 wherein the first and second subsets comprise geographical areas for the regions, methods of payment for the payment terms, methods of delivery for the delivery terms, times for the contract length, capacities for the contract volume, types of material for the material, and at least one of approval and certification for the qualification status.

15. The system of claim 12 wherein the at least one identifier comprises a number selected from a range of numbers assigned to the subset.

16. The system of claim 12 wherein the processor is further configured to store bid terms for each subset in a database.

17. The system of claim 16 wherein the bid terms comprise at least one of a reserve price, a historic price, a target price, time dependent variables, and bid strategies.

18. The system of claim 12 wherein the processor is further configured to cause a display of, for each bidder in the first subset of bidders: a new lowest bid and an identifier assigned to the bidder that submitted the new lowest bid.

19. The system of claim 12 wherein the at least one identifier indicates a number of bidders in the first subset.

20. The system of claim 12 wherein the at least one identifier conceals a number of bidders in the first subset from bidders outside of the first subset.

21. A computer program product embodied in a tangible computer readable medium and comprising computer instructions for:
receiving a plurality of bids from a plurality of bidders wherein the plurality of bidders are participants in a same auction;
using a parameter to distinguish the bidders into at least a first subset and a second subset;
assigning at least one identifier to the bidders in the first subset, wherein the at least one identifier is known to the bidders in the first subset and is neither assigned to nor known to the bidders in the second subset; and
displaying, to each bidder in the first subset of bidders, a lowest bid and an identifier assigned to the bidder that submitted the lowest bid.

22. The computer program product of claim 21 wherein the parameter comprises at least one of regions, payment terms, delivery terms, contract length, contract volume, material, and qualification status.

23. The computer program product of claim 21 wherein the first and second subsets comprise geographical areas for the regions, methods of payment for the payment terms, methods of delivery for the delivery terms, times for the contract length, capacities for the contract volume, types of material for the material, and at least one of approval and certification for the qualification status.

24. The computer program product of claim 21 wherein the at least one identifier comprises a number selected from a range of numbers assigned to the first subset.

25. The computer program product of claim 21, further comprising setting, in each subset, bid terms.

26. The computer program product of claim 25 wherein the bid terms comprise at least one of a reserve price, a historic price, a target price, time dependent variables, and bid strategies.

27. A computer program product of claim 21, further comprising receiving a new lowest bid and displaying to each bidder in the first subset of bidders the new lowest bid and an identifier assigned to the bidder that submitted the new lowest bid.

28. The computer program product of claim 21 wherein the at least one identifier indicates a number of bidders in the first subset.

29. The computer program product of claim 21 wherein the at least one identifier conceals a number of bidders in the first subset from bidders outside of the first subset.

* * * * *